United States Patent [19] [11] 4,278,902
Loy et al. [45] Jul. 14, 1981

[54] TUNABLE 16-MICRON COHERENT SOURCE INCLUDING PARAHYDROGEN RAMAN TRANSITION AND METHOD

[75] Inventors: Michael M. Loy, Mount Kisco; Peter P. Sorokin, Ossining, both of N.Y.

[73] Assignee: International Business Machines Corporation, Armonk, N.Y.

[21] Appl. No.: 974,588

[22] Filed: Dec. 29, 1978

[51] Int. Cl.³ .............................................. H03F 7/00
[52] U.S. Cl. .................................... 307/426; 307/424
[58] Field of Search ................. 307/426, 424; 250/495

[56] References Cited
PUBLICATIONS

Loy et al., "Applied Physics Letters", Apr. 15, 1977, pp. 415–417.
Sorokin et al., "IEEE J. of Quantum Electronics", Oct. 1977, pp. 871–875.

Primary Examiner—David C. Nelms
Assistant Examiner—Darwin R. Hostetter
Attorney, Agent, or Firm—Pollock, Vande Sande & Priddy

[57] ABSTRACT

A coherent tunable narrow band IR source in the vicinity of 16 μm is achieved by four-wave parametric mixing in parahydrogen. A pair of colinear laser beams, one from a narrow band $CO_2$ laser, and a second from a multiline laser with output of wave number significantly below 14,400 cm.$^{-1}$, is focused in a parahydrogen containing cell. The multi-line laser beam drives a Raman process in the cell. The narrow band $CO_2$ input beam mixes with this driver beam and the Stokes wave resulting from the Raman process to produce a 16 μm output beam. Tuning of the $CO_2$ laser allows tuning of the 16 μm radiation emitted by the parahydrogen cell.

20 Claims, 3 Drawing Figures

TUNABLE 16-MICRON COHERENT SOURCE INCLUDING PARAHYDROGEN RAMAN TRANSITION AND METHOD

GOVERNMENT RIGHTS

The Government has rights in this invention pursuant to Contract N00014-76-C-0907, awarded by the Department of the Navy, and Contract DAAG 29-76-C-0062, awarded by the Department of the Army.

DESCRIPTION

1. Technical Field

The invention provides a method and apparatus for producing tunable coherent infrared radiation in the vicinity of 16 um.

2. Background Art

Sources of coherent narrow band radiation of generally optical wavelengths have a variety of uses; see, for example, Dewey U.S. Pat. No. 3,731,110; Massey U.S. Pat. No. 3,947,688; and Hodgson et al U.S. Pat. No. 3,892,979. Of even greater applicability are sources of such coherent radiation which are capable of being tuned, i.e., adjusted in frequency.

One particular application for a tunable source of infrared radiation in the vicinity of 16 um is to selectively excite particular isotopes of uranium for enrichment purposes; see, for example, "Generation of 16 um Radiation by Four-Wave Mixing in Parahydrogen" by Loy, Sorokin and Lankard, *Applied Physics Letters*, Volume 30, Number 8, Apr. 15, 1977, pages 415–417.

In the referenced publication, as well as in "A 16 um Radiation Source Utilizing Four-Wave Mixing In Cooled Parahydrogen Gas", *IEEE Journal of Quantum Electronics*, Volume QE-13 No. 10, Oct. 1977, pages 871–875, Sorokin, Loy and Lankard describe two techniques which appear to be capable of producing coherent tunable 16 um radiation. In a first of these techniques, stimulated rotational Raman scattering is to be driven by a powerful $CO_2$ laser beam in gaseous parahydrogen. This technique has not yet been demonstrated since the Raman threshold has not been reached. In a second technique with a lower threshold, the output of a ruby laser is employed to drive the hydrogen molecules coherently in the same stimulated rotational Raman scattering process. The light (Stokes beam) produced by this Raman scattering process then mixes with the ruby and $CO_2$ laser input beams to produce 16 um radiation.

However, the authors conclude that the second technique falls short of satisfying the power required for the uranium isotope separation.

Accordingly, it is one object of the present invention to provide a narrow band tunable source of 16 um radiation. It is another object of the invention to provide such a source of radiation which is, at the same time, scalable to energies higher than that capable of being achieved by the ruby-$CO_2$ four-wave mixing processes known in the prior art. It is still another object of the invention to drive a stimulated Raman process with a multi-line laser with output of wave number significantly below 14,400 cm.$^{-1}$, while simultaneously injecting into the medium a narrow band $CO_2$ laser beam to obtain a narrow band output of scalable power at 16 um.

DISCLOSURE OF THE INVENTION

The present invention meets these and other objects of the invention by using a four-wave mixing process in a parahydrogen containing cell. Input energy for conversion to 16 um energy is provided by a $CO_2$ laser which may be tuned in any conventional fashion, i.e., either continuously tunable in a pressure broadened regime, or discretely tunable in accordance with other well-known techniques. In addition, instead of the driving ruby laser, or a $Nd^{3+}$: YAG laser, also suggested in the prior art as a substitute for the ruby laser, a multi-line gas laser with output of wave number significantly below 14,400 cm.$^{-1}$ is used. Specific examples are HF emitting at about 3350 cm.$^{-1}$, DF at about 2500 cm.$^{-1}$, HCl at about 2600 cm.$^{-1}$, DCl at about 1900 cm.$^{-1}$, and CO at about 1800 cm.$^{-1}$.

One factor limiting the power capability of the ruby-$CO_2$ infrared source is the fact that the 16 um radiation is produced only in the simultaneous presence of the ruby laser and $CO_2$ radiation. That time overlap is limited by the typical 60 nanosecond (20 nanoseconds at half-power points) length of the ruby laser pulse, since the $CO_2$ laser can produce pulses at least 1 microsecond in duration. Also the ruby laser has a relatively low repetition rate which would limit the average 16 um power generated. On the other hand, the multi-line lasers referred to above are all gas lasers capable of higher repetition rates and longer pulses. For example, the HF laser typically provides a 200 nanosecond pulse, substantially increasing the time duration during which the HF and $CO_2$ laser pulses are simultaneously present.

Furthermore, energy conversion from the input $CO_2$ beam to the output 16 um beam is inversely proportional to the square of the Stokes frequency which, itself, is equal to the difference between the photon energy of the driving source and that of the Raman vibration. Since the photon energy of each of the multi-line sources is about ¼ or less of that of the ruby laser, the efficiency of the power conversion process will be significantly better than that of the ruby-$CO_2$ laser technique.

A potential impediment to the use of a multi-line driver, $CO_2$ input beam technique is that, whereas the ruby laser has a narrow band output, the multi-line driver, on the other hand, is not narrow band. However, since the four-wave mixing process is produced as a result of stimulated Raman scattering, the multi-line laser output is effectively summed and is usable as if it were a single line of narrow band output of the same total pulse energy.

BRIEF DESCRIPTION OF DRAWINGS

The present invention will now be further explained in connection with the attached drawings in which like reference characters identify identical apparatus and in which.

BEST MODE FOR CARRYING OUT THE INVENTION

Figure 1:
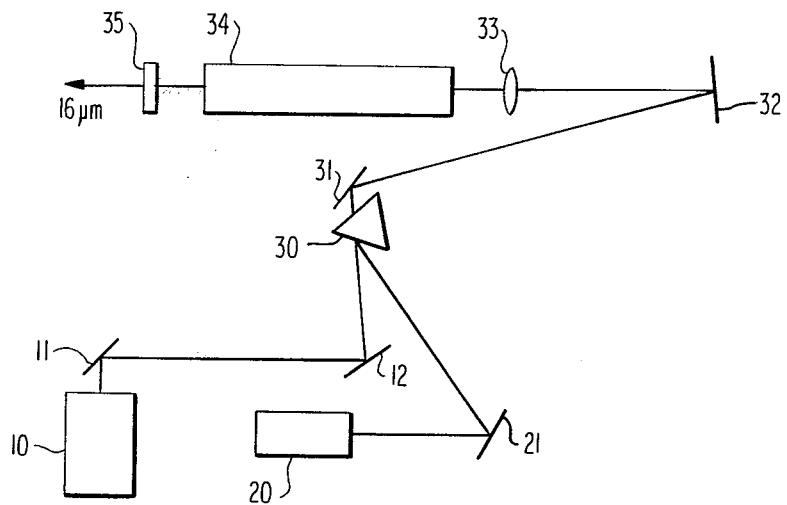
FIG. 1 is a block diagram of an arrangement for colinearly combining outputs of two lasers in a parahydrogen cell to produce a 16 um output.
Figure 2:
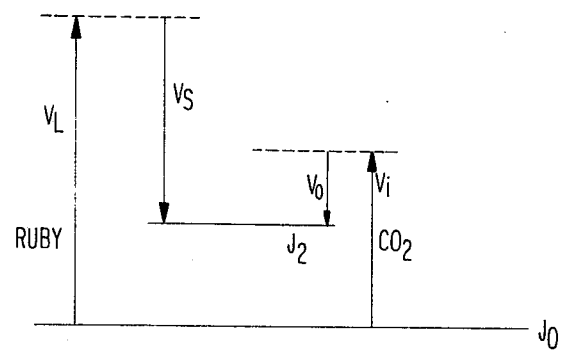
FIG. 2 is an energy level diagram of the prior art ruby-$CO_2$ laser four-wave mixing process.

FIGS. 1 and 2 illustrate the prior art ruby-$CO_2$ laser 16 um source. FIG. 1 illustrates a Q-switched ruby laser 20 synchronized with a pulsed grating-tuned $CO_2$ TEA laser. With the aid of mirrors 11, 12, 21, 31, 32 and prism 30, the beams from these lasers are made colinear and focused by lens 33 into a parahydrogen containing cell 34. An optical filter 35 passes 16 um output and blocks the $CO_2$ and ruby laser outputs. The parahydrogen cell does not form an optical cavity and the end wall adjacent lens 33 should transmit the $CO_2$ and ruby laser beams well while the opposite wall need only pass the 16 um output. Materials and sizes of the cell components can be those given in the referenced publications.

FIG. 2 illustrates an energy level diagram of the four-wave mixing process. The ruby laser pulse ($v_L \simeq 14,400$ cm.$^{-1}$) produces stimulated rotational Raman scattering at the 354.33 cm.$^{-1}$ Raman line of $H_2$. A Stokes beam $v_s$, at $\simeq 14046$ cm.$^{-1}$ is produced in this process. The ruby laser beam ($v_L$) Stokes beam ($v_s$) and a $CO_2$ laser beam ($v_i = 982.1$ cm.$^{-1}$) beat together to create a resonantly enhanced nonlinear polarization at $v_o$ (627.8 cm.$^{-1}$) which then radiates. Tuning the $CO_2$ laser thus tunes the output in the vicinity of 16 um. For example, with the $CO_2$ laser at 982.1 cm.$^{-1}$, the output frequency is 627.8 cm.$^{-1}$. There is always a threshold for producing stimulated Raman scattering. Since the Stokes gain is proportional to the Stokes frequency, $v_s$, the threshold for stimulated Raman scattering is much lower with the use of a ruby laser beam for a driver than the use of a $CO_2$ laser beam for the same purpose. However, as mentioned above, use of a high frequency driver results in a high Stokes frequency ($v_s$) which reduces, in turn, the amount of output energy that can be produced by four-wave mixing by a factor inversely proportional to the square of $v_s$. This factor, together with the short time overlap of ruby and $CO_2$ beams, appears to preclude generation of sufficient output energy per pulse in the scheme which uses these lasers together.

FIG. 1 also illustrates the inventive 16 um source. When using the inventive arrangement, the Q-switched ruby laser 20 is replaced by the multi-line laser. Synchronization between the multi-line driver and the $CO_2$ laser can be effected in any convenient manner. In contrast to the ruby laser, whose maximum pulse width is on the order of 60 nanoseconds, the multi-line gas lasers referred to have relatively longer pulse widths, for example, the HF pulse width is on the order of 200 nanoseconds.

Figure 3:
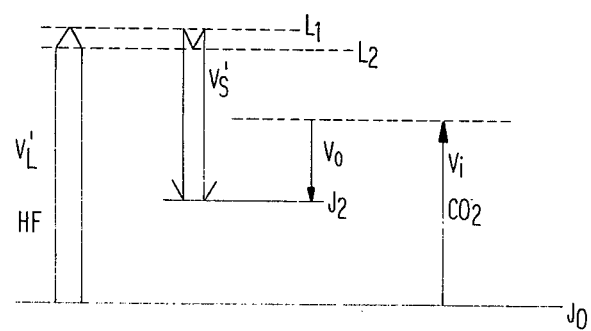
FIG. 3 is an energy level diagram for the inventive process.

FIG. 3 is generally applicable to the inventive four-wave mixing in which a multi-line drive laser emits $v_L'$ which, through a stimulated Raman scattering, produces a Stokes wave $v_s'$. One difference between the energy level diagram of FIGS. 2 and 3 is that the ruby laser has a narrow band output while the referenced drive lasers emit in multi-line form and the Stokes wave $v_s'$ is also multi-line in character. For example, with an HF drive laser, FIG. 3 illustrates the multi-line output of the HF laser $v_L'$ ($\simeq 3350$ cm.$^{-1}$), with lines occurring over a broad spectral range. The multi-line output of the HF laser is effectively summed through the mechanism of several Stokes waves $v_s'$ (with energy lying in a range $L_1$-$J_2$ to $L_2$-$J_2$), driving the same 354.33 cm.$^{-1}$ Raman transition of $H_2$. The inventive arrangement illustrates, however, a number of significant advantages over the ruby laser-$CO_2$ laser technique described in the cited publications.

Firstly, as a result of the greater time overlap, for example, 200 nanoseconds vs. 60 nanoseconds, the energy conversion process is much more efficient.

Furthermore, in accordance with equation 1 of the cited articles, assuming fixed intensities of the various waves, the energy conversion efficiency increases inversely with the square of the Stokes frequency. Thus, a further significant increase in power conversion is expected. The approximate Stokes frequency ($v_s'$) with the HF laser is about 3,000 cm.$^{-1}$, and for a 16 um output, about 4% of the $CO_2$ laser energy can be converted to 16 u energy. For example, with about a 1J $CO_2$ laser pulse, we can expect about a 40 mJ pulse at 16 um. Other drive lasers result in Stokes frequencies even lower than the 3000 cm.$^{-1}$ and so exhibit still higher conversion efficiencies.

Critical to the use of the multi-line drive laser in this process is the ability to avoid a penalty for the relatively broad or multi-line output. This characteristic fits quite well with the stimulated Raman scattering process since the multi-line outputs are, in effect, summed, and thus, the multi-line output is not a disadvantage and is effective as if it were a single line output.

Tuning the inventive 16 um source can be effectively achieved by employing a continuously tunable pressure broadened $CO_2$ laser, which laser is commercially available. The pulse width of the $CO_2$ laser can be varied within the range of 60 nanoseconds to a microsecond, and could well be optimized, using conventional techniques to be at least on the order of the pulse width of the drive laser, which may be 200 nanoseconds, for example, although longer pulse widths may be advantageous. For example, an HF laser of 200 nanoseconds pulse width and 1-5J pulse energy should be sufficient to well exceed Raman threshold in the parahydrogen cell. With such a laser and with a 1J $CO_2$ pulse, there should be produced at least 40 mJ pulse energy at 16 um if the pulse outputs of the HF and $CO_2$ lasers are largely spatially and temporally overlapping.

The $CO_2$ laser can also be tuned by any other conventional technique, such as by the use of rare isotopes, or pumping to adjacent lines.

THEORETICAL BASIS

Four-wave mixing processes are known; see, e.g., the publications cited above, as well as Hodgson et al U.S. Pat. No. 3,992,979; Dewey, Jr., U.S. Pat. No. 3,731,110; Bjorkholm et al, U.S. Pat. No. 4,058,739; and Hodgson et al, U.S. Pat. No. 3,881,115. In the inventive four-wave mixing process, the drive laser excites the 354.3 cm.$^{-1}$ rotational Raman line of $H_2$ producing a Stokes wave $v_s'$. The $CO_2$ laser beam at 982.1 cm.$^{-1}$ then mixes with $v_L'$, $v_s'$ producing an output at 627.8 cm.$^{-1}$. Both the frequency and intensity of the output beam ($v_o$) depend on the frequency and intensity of the $CO_2$ input beam ($v_i$). Thus, tuning the $CO_2$ laser directly tunes the output. The output intensity is directly proportional to $CO_2$ input intensity. Once the Stokes wave $v_s'$ is produced by the driver, there is no threshold for $CO_2$ power to exceed to produce $v_o$. Accordingly, even a pressure broadened $CO_2$ laser can be used for continuous tuning, if desired, although the penalty paid is a reduction of $CO_2$ input intensity and a corresponding reduction in the output $v_o$ intensity.

PREFERRED EMBODIMENT

There are a number of factors to be considered in selecting a drive laser for the inventive source. Firstly, a low wave number is desirable (i.e., significantly lower than the 14,400 cm.$^{-1}$ for the ruby laser) since this results in conversion efficiency exceeding that of the prior art ruby-$CO_2$ source. However, as the drive wave number is reduced, the Raman threshold increases, so, preferably, a drive with lower wave number output may require higher pulse energy, or at least enough to exceed Raman threshold. In addition, the drive laser should be capable of a higher repetition rate than glass lasers, or ruby.

Each of the potential drive lasers mentioned is a gas laser and is capable of pulsing at rates in excess of the ruby laser and each can be arranged to emit with pulse widths on the order of 200 nanoseconds, i.e., significantly longer than the ruby pulse width.

The drive lasers referred to all emit in multi-line form at the approximate "energy center of gravity" wave numbers:

HF 3350 cm.$^{-1}$
DF 2500 cm.$^{-1}$
HCL 2600 cm.$^{-1}$
DCL 1900 cm.$^{-1}$
CO 1800 cm.$^{-1}$

Of these, the HF, DF and CO lasers have been demonstrated to emit at sufficient pulse energies to exceed the Raman threshold. The CO laser is particularly preferred since its low wave number emission means a low Stokes wave number, resulting in a high conversion efficiency. While this same parameter means a relatively higher Raman threshold, the CO laser has been demonstrated at the multi-tens of joules, per pulse level which should easily exceed the Raman threshold.

In accordance with one preferred embodiment, using an HF drive the $CO_2$ pulse width is optimized to be equal to the HF pulse width and synchronized therewith. The colinear HF and $CO_2$ beams are focused (focal length ~ 1 m) on a parahydrogen cell (pressurized preferably less than 3 atm and most preferably about 1 atm) which may also be cooled in the fashion shown in the cited publications in the range 300° K. to 100° K. Suitable filtering against the $CO_2$ and HF energy at the cell output will allow transmission of the 16 um output. Although a 1J HF pulse energy might exceed the Raman threshold the HF pulse energy is preferably in the range 1J to 5J. The $CO_2$ laser is tuned by any conventional technique, ideally, a continuously tuned pressure broadened laser is employed. The high conversion efficiency (~4%) means that a 1J $CO_2$ pulse intensity will give a 40 mJ output pulse which should suffice for isotope separation.

A second preferred embodiment is identical to the preceding with a DF drive replacing the HF drive. The resulting Stokes wave (~2250 cm.$^{-1}$) should increase conversion efficiency from 4% to over 7% (i.e., $[(3000/2250)^2 \times 4\%]$).

A third preferred embodiment is identical to the first preferred embodiment with a CO drive replacing the HF drive. The resulting Stokes wave (~1500 cm.$^{-1}$) should produce a conversion efficiency of about 16% (i.e., $[(3000 \text{ cm.}^{-1}/1500 \text{ cm.}^{-1})]^2 \times 4\%$).

INDUSTRIAL APPLICABILITY

While a 16 um coherent tunable source has wide applicability, it is useful for uranium isotope separation in processes disclosed, for example, by Letokhov and Moore, Sov. U. Quantum Electron. 6, 129 (1976); 6,259 (1976) and Jensen, Marinuzzi, Robinson and Lockwood, Laser Focus 12, 51 (1976).

Having thus described our invention, what we claim as new, and desire to secure by Letters Patent is:

1. A source of coherent IR in the vicinity of 16 um comprising:
   a parahydrogen cell (34);
   a $CO_2$ laser (10);
   a multi-line gas laser (20) emitting with wave number significantly below 14,400 cm.$^{-1}$; and
   means for coupling emissions of said $CO_2$ and multi-line gas laser to said parahydrogen cell (11, 12, 21, 30, 31, 32, 33) and output means for passing 16 um emissions of said parahydrogen cell (35).

2. The apparatus of claim 1 wherein said parahydrogen cell (34) is at about ambient pressure.

3. An IR source emitting at 627.8 cm.$^{-1}$ including the apparatus of claim 1 wherein said $CO_2$ laser (10) emits at a frequency ($v_i$) which, when beat with a Raman driver wave ($v_L'$) and a corresponding Stokes wave ($v_s'$) in said parahydrogen cell (34) produces an emission at 627.8 cm.$^{-1}$ ($v_o$).

4. A tunable source including the apparatus of claim 1 wherein said $CO_2$ laser is a continuously tunable laser (10).

5. The apparatus of claim 1 wherein said multi-line gas laser is an HF laser emitting at about 3350 cm.$^{-1}$.

6. The apparatus of claim 1 wherein said multi-line gas laser is a DF laser emitting at about 2500 cm.$^{-1}$.

7. The apparatus of claim 1 wherein said multi-line gas laser is a CO laser emitting at about 1800 cm.$^{-1}$.

8. The apparatus of claim 1 wherein said multi-line gas laser is an HCL laser emitting at about 2600 cm.$^{-1}$.

9. The apparatus of claim 1 wherein said multi-line gas laser is a DCL laser emitting at about 1900 cm.$^{-1}$.

10. The apparatus of claim 5 wherein said HF laser (10) emits with a pulse energy in the range 1J to 5J.

11. A method of producing coherent IR comprising the steps of:
    providing a parahydrogen cell (34);
    energizing a multi-line gas laser (20) emitting significantly below 14,400 cm.$^{-1}$ with sufficient intensity to exceed a Raman threshold in said cell and coupling said emissions to said cell;
    energizing a $CO_2$ laser (10) emitting at about 982 cm.$^{-1}$ and coupling said emissions to said cell to spatially and temporally overlap with said multi-line gas laser emissions; and coupling 16 um emission from said cell.

12. The method of claim 11 wherein said multi-line gas laser (20) comprises a laser selected from the group consisting of HF, DF, CO, HCL and DCL.

13. A coherent IR source in the vicinity of 16 um comprising:
    a parahydrogen cell (34);
    multi-line laser source means for driving a Raman process to excite a 354.3 cm.$^{-1}$ Raman line in said cell (20, 21, 30, 31, 32, 33);
    a $CO_2$ laser (10);
    means for coupling emissions of said $CO_2$ laser to said parahydrogen cell (11, 12, 30-33) colinearly and temporally coincident with said Raman process; and
    output means for passing a 16 um emission from said cell (35).

14. The apparatus of claim 13 wherein said multi-line laser source means comprises an HF laser (20) and second coupling means for coupling said multi-line HF laser emissions to said cell (21, 30-33).

15. The apparatus of claim 13 wherein said multi-line laser source means comprises a DF laser (20) and second coupling means for coupling said multi-line DF laser emissions to said cell (21, 30-33).

16. The apparatus of claim 13 wherein said multi-line laser source means comprises a CO laser (20) and second coupling means for coupling said multi-line CO laser emissions to said cell (21, 30–33).

17. The apparatus of claim 13 wherein said multi-line laser source means comprises an HCL laser (20) and second coupling means for coupling said multi-line HCL laser emissions to said cell (21, 30–33).

18. The apparatus of claim 13 wherein said multi-line laser source means comprises a DCL laser (20) and second coupling means for coupling said multi-line DCL laser emissions to said cell (21, 30–33).

19. The apparatus of claim 13 wherein said parahydrogen cell (34) is at about ambient pressure.

20. A source of tunable IR including the apparatus of claim 13 and wherein said $CO_2$ laser is a pressure broadened continuously tunable laser (10).

* * * * *